United States Patent Office 3,578,608
Patented May 11, 1971

3,578,608
REGENERATING A PLATINUM OXIDE DEACTIVATED CATALYST RESULTING FROM USE IN ELIMINATING OXIDES OF NITROGEN FROM GASES
Kamran Aykan, Woodbury, N.J., assignor to E. I. du Pont de Nemours and Company, Wilmington, Del.
No Drawing. Filed Sept. 24, 1968, Ser. No. 762,142
Int. Cl. B01j 11/18, 11/02
U.S. Cl. 252—411                     6 Claims

ABSTRACT OF THE DISCLOSURE

Regenerating a deactivated platinum catalyst by heating a platinum oxide deactivated catalyst on a carrier and passing gas inert in the system under conditions of regeneration over the deactivated catalyst for a time and at a temperature sufficient to cause dissociation of a platinum oxide and reform platinum in metallic form on the carrier.

BACKGROUND OF THE INVENTION

This invention relates to the regeneration of platinum catalysts and, more particularly, to the regeneration of platinum catalysts deactivated by a nitrogen oxide.

Catalytic composites containing metallic components on a carrier have attained extensive commercial utility. Industries such as the pharmaceutical, petroleum, etc. utilize the platinum group metal-containing catalysts for promoting chemical reactions. Within recent years such catalysts have been used to reduce air pollution. For example, in the production of nitric acid by the oxidation of ammonia it is difficult to convert all the oxides of nitrogen to nitric acid. As a result of the incomplete conversion of these oxides, some oxides of nitrogen such as NO and $NO_2$ are discharged to the atmosphere with the waste gases, thus creating a serious air pollution problem. In order to overcome this pollution problem, the waste gases are catalytically purified to eliminate oxides of nitrogen wherein the valence of nitrogen in the compound is greater than plus 1. This is accomplished by passing the waste gases to which a fuel for the nitrogen oxide, e.g., ammonia, has been added over a platinum containing catalyst on a support or carrier, usually an inorganic oxide such as alumina, as described in Pat. 3,245,920. Such procedure is quite effective for eliminating oxides of nitrogen, however, the useful life of the catalyst is relatively short and the once catalytically active metal, i.e., platinum, becomes deactivated or less effective. This has necessitated replacing the platinum catalyst with a new one by, for example, removing the deactivated catalyst from the system, and treating the spent catalyst in order to recover the valuable metal therefrom. Replacement of the catalyst is both expensive and time-consuming. The process of this invention eliminates this difficulty by providing physical means, rather than the usual chemical means of, for example, reduction with hydrogen, by which platinum catalysts, deactivated due to the presence of a nitrogen oxide, can be regenerated, and regeneration by said physical means can be conducted in vessel in which the catalyst is used, i.e., in situ.

SUMMARY OF THE INVENTION

It has now been discovered that a platinum catalyst deactivated by the presence of a nitrogen oxide can be regenerated by a physical method which comprises heating a platinum oxide, e.g. $PtO_2$, PtO, etc., deactivated catalyst on a carrier by passing gas inert in the system under conditions of regeneration over the catalyst to heat the deactivated catalyst for a time and at a temperature sufficient to cause dissociation of a platinum oxide and thus reform platinum in metallic form on the carrier thereby regenerating the deactivated catalyst. In order to regenerate the catalyst it has been found that the platinum oxide(s) that forms during use must be dissociated. The time and temperature used in the present process for dissociating a platinum oxide and regenerating the deactivated catalyst by means of passing heated gas over the deactivated catalyst can vary widely. In general, the higher the temperature to which the deactivated catalyst is heated during regeneration, the shorter the time of treatment required for regenerating the catalyst. Usually the deactivated platinum catalyst that is treated according to this process is on an alumina carrier, although the process is applicable to treating platinum on other carriers. Conveniently, the same inert gas that is used to sweep the deactivated catalyst and maintain regeneration temperatures can be used also to heat said deactivated catalyst to the necessary regeneration temperatures. Furthermore, the present procedure permits regenerating the deactivated platinum catalyst in the vessel in which it is used, i.e., in situ, and removal of the deactivated catalyst from the vessel for regeneration is unnecessary. Any gas or mixture of gases that is inert in the system under conditions of regeneration can be used in the process of this invention to heat the deactivated catalyst to the necessary temperatures and to maintain said temperature on the catalyst until regeneration is complete.

DETAILED DESCRIPTION OF INVENTION

The present invention involves regenerating a platinum catalyst that has been deactivated on a carrier due to the presence of a nitrogen oxide, i.e., NO and/or $NO_2$, and is in the amorphous phase to the catalytically active metallic form of the metal. The spent catalyst on a carrier, deactivated by the presence of a nitrogen oxide, is heated by passing gas that is inert in the system under conditions of regeneration, e.g., air, over the catalyst to heat the deactivated catalyst for a time and at a temperature sufficient to cause dissociation of a platinum oxide and thus reform platinum in metallic form on the carrier thereby regenerating the deactivated catalyst. Generally regeneration is accomplished by heating the platinum oxide(s) on a carrier to temperatures of about from 300° to 900° C., usually at least about 350° C., and holding the deactivated catalyst at such temperatures for about two to sixteen hours by means of passing heated gas inert in the system under regeneration conditions over said catalyst to maintain said temperatures. It is believed such procedure, among other things, changes a catalytically inactive amorphous platinum oxide(s) on the carrier to the catalytically active metal. When the deactivated catalyst, which has been bleached white due to continued use, reverts to its original dark gray color, which is indicative of metallic platinum, it is a sign that regeneration is complete. Preferably, the inert gas used in regenerating the catalyst, heats the deactivated catalyst, maintains the required temperature, and sweeps away oxygen, thus permitting metallic platinum to reform on the carrier.

The deactivated platinum catalyst that is regenerated according to the process of this invention is supported on or composited with a carrier. The carrier material on which platinum is supported is usually a highly refractory inorganic oxide such as alumina, silica, silica gel, zirconia, etc. and most often the platinum is supported on alumina. The carrier can be in the form of pellets, granules, extruded shapes or powders. The process of this invention is not dependent on any particular carrier for the platinum catalyst nor its method of preparation. The amount of metal used as catalyst on the carrier varies but, generally, is within the range of about 0.1 to 3% by weight and such amounts are not lost during the present regeneration process. Under most conditions the carrier is in the form of pellets having an average diameter of about ⅛ inch.

formed on the carrier. The color of the treated catalyst changed to its original dark gray and a gas heated to 250° C. containing NO and $NH_3$ as fuel was passed over the catalyst at a certain rate to determine its effectiveness for removal of NO.

| | Regeneration conditions | | | Percent consumption of NO fed at contact times of— | | |
|---|---|---|---|---|---|---|
| | Temperature (° C.) | Time (hrs.) | Gas atmosphere | 0.5 sec. | 1.0 sec. | 3.0 sec. |
| 1 | [1] Control | | | 3 | 3 | 14 |
| 2 | 300 | 16 | 100 cc./min. air | 75 | 99 | 99 |
| 3 | 350 | 2 | do | 99 | 99 | 99 |
| 4 | 350 | 16 | do | 99 | 99 | 99 |
| 5 | 900 | 2 | do | 99 | 99 | 99 |
| 6 | 400 | 2 | 100 cc./min. nitrogen | 99 | | 99 |
| 7 | 600 | 2 | do | 99 | | 99 |
| 8 | 400 | 2 | 100 cc./min. argon | 99 | | 99 |
| 9 | 600 | 2 | do | 99 | | 99 |
| 10 | 400 | 2 | 100 cc./min. $CO_2$ | 99 | | 99 |
| 11 | 600 | 2 | 100 cc./min. $CO_2$ | 99 | | 99 |

[1] Sample of deactivated catalyst prior to regeneration.

As stated above, any gas that is inert under the conditions of regeneration, e.g., inert to oxygen and platinum, can be used to heat the deactivated catalyst. The particular gas that is inert in the regeneration system is passed over the deactivated catalyst to heat it, sweep it substantially free of oxygen and maintain the required temperatures for catalyst regeneration. Representative gases that can be used in the regeneration process that are inert in the system are nitrogen, air, carbon dioxide, steam, helium, neon, argon, xenon, krypton, and mixtures thereof, and preferably nitrogen of air is utilized. According to this method for catalyst regeneration, which is conveniently, but not necessarily, carried out at about atmospheric pressure, the spent platinum catalyst in amorphous form is restored to the catalytically active metal by physical means of heating the spent catalyst with a gas that is inert in the system flowing over the deactivated catalyst. The gas does not combine chemically with the spent catalyst and, therefore, is not an oxidizing or reducing agent. Thus, the process is a physical operation for regenerating metallic platinum catalysts deactivated due to the presence of a nitrogen oxide rather than the usual chemical methods used to regenerate catalysts. Advantageously, the spent catalyst deactivated by the presence of a nitrogen oxide can be regenerated in situ. That is to say, the deactivated catalyst can be heated by the flow of hot gas that is inert in the system across the catalyst bed and said catalyst need not be removed from the vessel or reaction zone in which it is employed for catalytic purification of oxides of nitrogen. Accordingly, the flow of hot gas over the catalyst bed serves the purpose of heating the deactivated catalyst to the desired temperature for the required time while said gas sweeps the deactivated catalyst thereby reforming platinum in metallic form on the carrier.

The following examples further illustrate the invention but are not to be considered as limiting the teaching of the invention.

A platinum-on-alumina catalyst that had been used as a nitrogen oxide abatement catalyst, of the type described in Pat. 3,245,920, was demonstrated to be substantially ineffective in the removal of nitrogen oxide due to continued use. The spent catalyst deactivated by the presence of a nitrogen oxide was treated for regeneration in the following manner:

10 cm.³ of the deactivated catalyst bleached white, containing about 0.5% platinum of ⅛ inch cylindrical alumina pellets, was placed in a 19 m. interior diameter quartz U-tube reactor and treated under the conditions indicated below. A hot gas inert under the conditions of regeneration was passed over the deactivated white catalyst for the time indicated and metallic platinum re- The procedure described above in Example 3 was repeated except that the deactivated catalyst, treated according to the process of the invention, was platinum-on-silica.

Metallic platinum is not detectable on the deactivated catalysts. However, after treatment according to the present process, metallic platinum is present and may be detechtable by X-ray diffraction. It is believed that the flow of gas over the deactivated platinum catalyst sweeps away oxygen from dissociated platinum oxide(s) without removing metal, and amorphous platinum oxide(s) on the spent catalyst is changed to the catalytically active metallic form of the metal which remains on the carrier, without material loss, to form the regenerated catalyst having excellent catalytic activity for removal of a nitrogen oxide, as illustrated in the above table.

I claim:
1. A process for regenerating a platinum catalyst used in gas purification and deactivated by the presence of a nitrogen oxide which comprises heating a platinum oxide deactivated catalyst on a highly refractory inorganic oxide carrier by passing gas inert in the system under conditions of regeneration and selected from the group consisting of air, nitrogen, carbon dioxide, argon and mixtures thereof over the catalyst to heat the deactivated catalyst to a temperature of about from 300° to 900° C. for about from 2 to 16 hours to cause dissociation of a platinum oxide and thus reform platinum in metallic form on said carrier thereby regenerating the deactivated catalyst.
2. The process of claim 1 wherein the carrier is alumina.
3. The process of claim 2 wherein the temperature is at least about 350° C.
4. The process of claim 2 wherein the gas is nitrogen.
5. The process of claim 2 wherein the gas is air.
6. The process of claim 5 wherein catalyst regeneration is carried out in the vessel in which the catalyst is used.

References Cited
UNITED STATES PATENTS

| 3,211,668 | 10/1965 | Yamamoto | 252—411 |
| 3,245,920 | 4/1966 | Keith et al. | 23—2 |
| 3,467,491 | 9/1969 | Hardison | 23—2 |

DANIEL E. WYMAN, Primary Examiner

P. E. KONOPKA, Assistant Examiner

U.S. Cl. X.R.

23—2